(12) United States Patent
Srebnik et al.

(10) Patent No.: US 12,020,041 B2
(45) Date of Patent: Jun. 25, 2024

(54) FAST CONFIGURATION OF A PROCESSING CIRCUIT

(71) Applicant: Mobileye Vision Technologies Ltd., Jerusalem (IL)

(72) Inventors: Daniel Srebnik, Jerusalem (IL); Yan Dubinski, Jerusalem (IL)

(73) Assignee: Mobileye Vision Technologies Ltd., Jerusalem (IL)

( * ) Notice: Subject to any disclaimer, the term of this patent is extended or adjusted under 35 U.S.C. 154(b) by 91 days.

(21) Appl. No.: 17/747,452

(22) Filed: May 18, 2022

(65) Prior Publication Data

US 2022/0374247 A1    Nov. 24, 2022

Related U.S. Application Data

(60) Provisional application No. 63/190,368, filed on May 19, 2021.

(51) Int. Cl.
*G06F 9/445* (2018.01)
(52) U.S. Cl.
CPC ................... *G06F 9/44505* (2013.01)
(58) Field of Classification Search
CPC .................................. G06F 9/44505
See application file for complete search history.

(56) References Cited

U.S. PATENT DOCUMENTS

| 2015/0066878 | A1* | 3/2015 | Agarwal | G06F 16/285 |
| | | | | 707/693 |
| 2017/0302762 | A1* | 10/2017 | Zhang | H04L 45/64 |
| 2022/0166854 | A1* | 5/2022 | Fan | H04L 69/04 |

* cited by examiner

*Primary Examiner* — Glenn A. Auve
(74) *Attorney, Agent, or Firm* — Schwegman Lundberg & Woessner, P.A.

(57) ABSTRACT

A method for configuring a processing circuit, the method may include (i) receiving, by the processing circuit, a compressed configuration information data structure (CCDS) that comprises multiple segments, wherein the CCDS was generated by a size-preserving compression process that maintains a size of the segments; (ii) decompressing the CCDS, by the processing circuit, to provide decompressed configuration information, wherein the decompressing comprises: searching for headers, wherein a header comprises sequence parameters, wherein the sequence parameters comprise at least one out of a length, an address field, and a type; and (iii) configuring the processing circuit using the decompressed configuration information, wherein the configuring is executed based on the headers.

24 Claims, 15 Drawing Sheets

FAST CONFIGURATION OF A PROCESSING CIRCUIT

PRIORITY

This application claims the benefit of priority to U.S. Provisional Patent Application Ser. No. 63/190,368, filed May 19, 2021, which is incorporated by reference herein in its entirety.

BACKGROUND

Advanced driver assistance systems (ADAS), and autonomous vehicle (AV) systems use cameras and other sensors together with object classifiers, which are designed to detect specific objects in an environment of a vehicle navigating a road. Object classifiers are designed to detect predefined objects and are used within ADAS and AV systems to control the vehicle or alert a driver based on the type of object that is detected its location, etc.

As ADAS and AV systems progress towards fully autonomous operation, it would be beneficial to protect data generated by these systems.

SUMMARY

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components illustrated in the drawings, and the illustrative methods described herein may be modified by substituting, reordering, removing, or adding steps to the disclosed methods. Accordingly, the following detailed description is not limited to the disclosed embodiments and examples.

Disclosed embodiments provide systems and methods that can be used as part of or in combination with autonomous navigation/driving and/or driver assist technology features. Driver assist technology refers to any suitable technology to assist drivers in the navigation and/or control of their vehicles, such as forward collision warning (FCW), lane departure warning (LDW), and traffic sign recognition (TSR), as opposed to fully autonomous driving. In various embodiments, the system may include one, two or more cameras mountable in a vehicle and an associated processor that monitor the environment of the vehicle. In further embodiments, additional types of sensors can be mounted in the vehicle ad can be used in the autonomous navigation and/or driver assist system. In some examples of the presently disclosed subject matter, the system may provide techniques for processing images of an environment ahead of a vehicle navigating a road for training neural networks or deep learning algorithms to estimate a future path of a vehicle based on images. In yet further examples of the presently disclosed subject matter, the system may provide techniques for processing images of an environment ahead of a vehicle navigating a road using a trained neural network to estimate a future path of the vehicle.

There are provided systems and methods, as illustrated in the claims and the specification.

Any combination of any subject matter of any claim may be provided.

Any combination of any method and/or method step disclosed in any figure and/or in the specification may be provided.

Any combination of any unit, device, and/or component disclosed in any figure and/or in the specification may be provided. Non-limiting examples of such units include a gather unit, an image processor and the like.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

Figure 1:
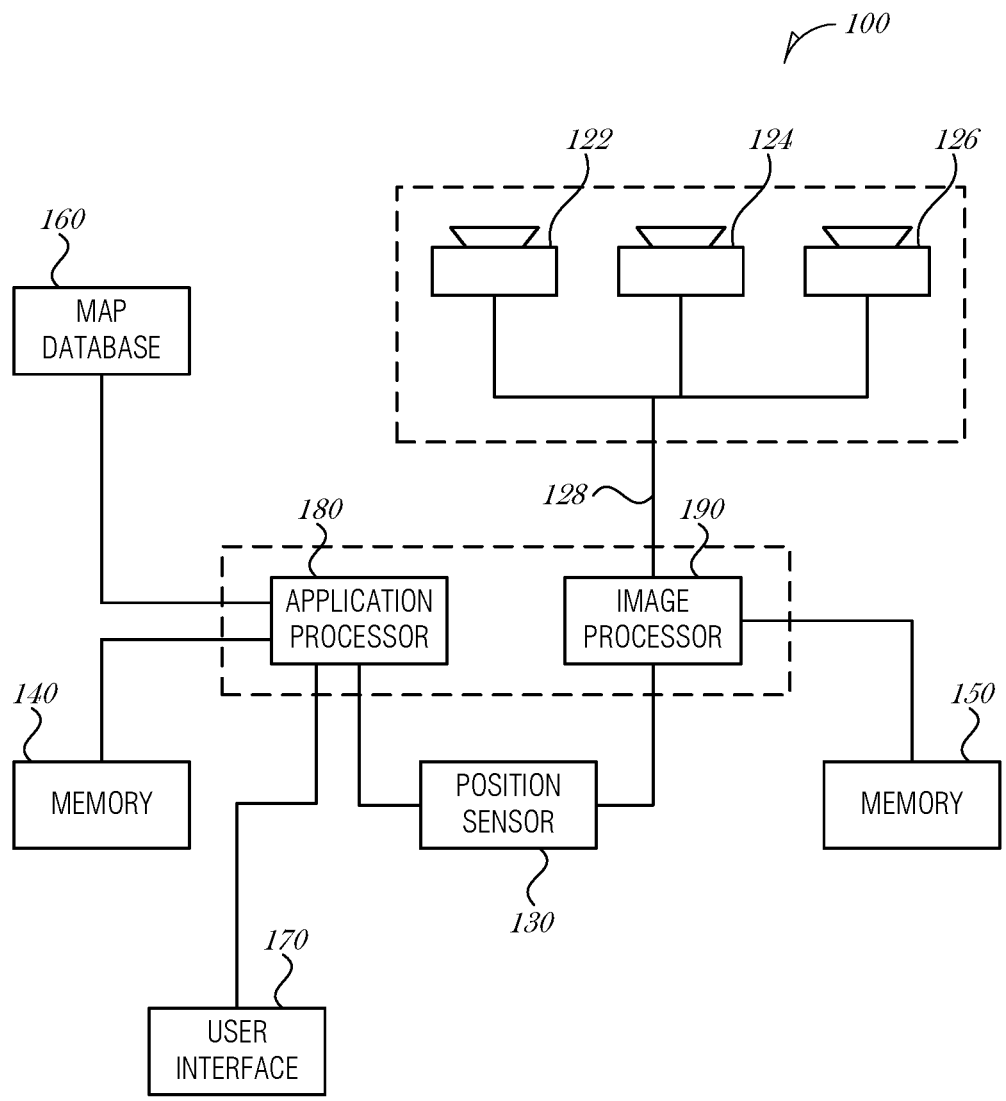
FIG. 1 is a block diagram representation of a system consistent with the disclosed embodiments.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by the memory device and should be applied mutatis mutandis to a non-transitory computer readable medium that stores instructions that may be executed by the memory device.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

A pixel may be a picture element obtained by a camera, may be a processed picture element.

Before discussing in detail examples of features of the processing images of an environment ahead of a vehicle navigating a road for training a neural networks or deep learning algorithms to estimate a future path of a vehicle based on images or feature of the processing of images of an environment ahead of a vehicle navigating a road using a trained neural network to estimate a future path of the vehicle, there is provided a description of various possible implementations and configurations of a vehicle mountable system that can be used for carrying out and implementing the methods according to examples of the presently disclosed subject matter. In some embodiments, various examples of the system can be mounted in a vehicle, and can be operated while the vehicle is in motion. In some embodiments, the system can implement the methods according to examples of the presently disclosed subject matter.

However, it would be appreciated that embodiments of the present disclosure are not limited to scenarios where a suspected upright object indication is caused by a high-grade road. The suspected upright object indication can be associated with various other circumstances, and can result from other types of image data and also from data that is not image based or is not exclusively image based, as well.

FIG. 1, to which reference is now made, is a block diagram representation of a system consistent with the disclosed embodiments. System 100 can include various components depending on the requirements of a particular implementation. In some examples, system 100 can include a processing circuit 110, an image acquisition unit 120 and one or more memory units 140, 150. Processing circuit 110 can include one or more processing devices. In some embodiments, processing circuit 110 can include an application processor 180, an image processor 190, or any other suitable processing device. Similarly, image acquisition unit 120 can include any number of image acquisition units and components depending on the requirements of a particular application. In some embodiments, image acquisition unit 120 can include one or more image capture devices (e.g., cameras), such as image capture device 122, image capture device 124, and image capture device 126. In some embodiments, system 100 can also include a data interface 128 communicatively connecting processing circuit 110 to image acquisition unit 120. For example, data interface 128 can include any wired and/or wireless link or links for transmitting image data acquired by image acquisition unit 120 to processing circuit 110.

Both application processor 180 and image processor 190 can include various types of processing devices. For example, either or both of application processor 180 and image processor 190 can include one or more microprocessors, preprocessors (such as image preprocessors), graphics processors, central processing circuit s (CPUs), support circuits, digital signal processors, integrated circuits, memory, or any other types of devices suitable for running applications and for image processing and analysis. In some embodiments, application processor 180 and/or image processor 190 can include any type of single or multi-core processor, mobile device microcontroller, central processing circuit, etc. Various processing devices can be used, including, for example, processors available from manufacturers such as Intel®, AMD®, etc. and can include various architectures (e.g., x86 processor, ARM®, etc.).

In some embodiments, application processor 180 and/or image processor 190 can include any of the EyeQ series of processor chips available from Mobileye®. These processor designs each include multiple processing circuit s with local memory and instruction sets. Such processors may include video inputs for receiving image data from multiple image sensors and may also include video out capabilities. In one example, the EyeQ2® uses 90 nm-micron technology operating at 332 Mhz. The EyeQ2® architecture has two floating point, hyper-thread 32-bit RISC CPUs (MIPS32® 34K® cores), five Vision Computing Engines (VCE), three Vector Microcode Processors (VMP®), Denali 64-bit Mobile DDR Controller, 128-bit internal Sonics Interconnect, dual 16-bit Video input and 18-bit Video output controllers, 16 channels DMA and several peripherals. The MIPS34K CPU manages the five VCEs, three VMP® and the DMA, the second MIPS34K CPU and the multi-channel DMA as well as the other peripherals. The five VCEs, three VMP® and the MIPS34K CPU can perform intensive vision computations required by multi-function bundle applications. In another example, the EyeQ3®, which is a third-generation processor and is six times more powerful that the EyeQ2®, may be used in the disclosed examples. In yet another example, the EyeQ4®, the fourth-generation processor, may be used in the disclosed examples.

While FIG. 1 depicts two separate processing devices included in processing circuit 110, more or fewer processing devices can be used. For example, in some examples, a single processing device may be used to accomplish the tasks of application processor 180 and image processor 190. In other embodiments, these tasks can be performed by more than two processing devices.

Processing circuit 110 can include various types of devices. For example, processing circuit 110 may include various devices, such as a controller, an image preprocessor, a central processing circuit (CPU), support circuits, digital signal processors, integrated circuits, memory, or any other types of devices for image processing and analysis. The image preprocessor can include a video processor for capturing, digitizing, and processing the imagery from the image sensors. The CPU can include any number of microcontrollers or microprocessors. The support circuits can be any number of circuits generally well known in the art, including cache, power supply, clock, and input-output circuits. The memory can store software that, when executed by the processor, controls the operation of the system. The memory can include databases and image processing software, including a trained system, such as a neural network, for example. The memory can include any number of random access memories, read only memories, flash memories, disk drives, optical storage, removable storage, and other types of storage. In one instance, the memory can be separate from the processing circuit 110. In another instance, the memory can be integrated into the processing circuit 110.

Each memory 140, 150 can include software instructions that when executed by a processor (e.g., application processor 180 and/or image processor 190), can control operation of various aspects of system 100. These memory units can include various databases and image processing software. The memory units can include random access memory, read only memory, flash memory, disk drives, optical storage, tape storage, removable storage, and/or any other types of storage. In some examples, memory units 140, 150 can be separate from the application processor 180 and/or image processor 190. In other embodiments, these memory units can be integrated into application processor 180 and/or image processor 190.

In some embodiments, the system can include a position sensor 130. The position sensor 130 can include any type of device suitable for determining a location associated with at least one component of system 100. In some embodiments, position sensor 130 can include a GPS receiver. Such receivers can determine a user position and velocity by processing signals broadcasted by global positioning system satellites. Position information from position sensor 130 can be made available to application processor 180 and/or image processor 190.

In some embodiments, the system 100 can be operatively connectible to various systems, devices and units onboard a vehicle in which the system 100 can be mounted, and through any suitable interfaces (e.g., a communication bus) the system 100 can communicate with the vehicle's systems. Examples of vehicle systems with which the system 100 can cooperate include: a throttling system, a braking system, and a steering system.

In some embodiments, the system 100 can include a user interface 170. User interface 170 can include any device suitable for providing information to or for receiving inputs from one or more users of system 100, including, for example, a touchscreen, microphone, keyboard, pointer devices, track wheels, cameras, knobs, buttons, etc. Information can be provided by the system 100, through the user interface 170, to the user.

In some embodiments, the system 100 can include a map database 160. The map database 160 can include any type of database for storing digital map data. In some examples, map database 160 can include data relating to a position, in a reference coordinate system, of various items, including roads, water features, geographic features, points of interest, etc. Map database 160 can store not only the locations of such items, but also descriptors relating to those items, including, for example, names associated with any of the stored features and other information about them. For example, locations and types of known obstacles can be included in the database, information about a topography of a road or a grade of certain points along a road, etc. In some embodiments, map database 160 can be physically located with other components of system 100. Alternatively or additionally, map database 160 or a portion thereof can be located remotely with respect to other components of system 100 (e.g., processing circuit 110). In such embodiments, information from map database 160 can be downloaded over a wired or wireless data connection to a network (e.g., over a cellular network and/or the Internet, etc.).

Image capture devices 122, 124, and 126 can each include any type of device suitable for capturing at least one image from an environment. Moreover, any number of image capture devices can be used to acquire images for input to the image processor. Some examples of the presently disclosed subject matter can include or can be implemented with only a single-image capture device, while other examples can include or can be implemented with two, three, or even four or more image capture devices. Image capture devices 122, 124, and 126 will be further described with reference to FIGS. 2B-2E, below.

It would be appreciated that the system 100 can include or can be operatively associated with other types of sensors, including for example: an acoustic sensor, a RF sensor (e.g., radar transceiver), a LIDAR sensor. Such sensors can be used independently of or in cooperation with the image acquisition unit 120. For example, the data from the radar system (not shown) can be used for validating the processed information that is received from processing images acquired by the image acquisition unit 120, e.g., to filter certain false positives resulting from processing images acquired by the image acquisition unit 120, or it can be combined with or otherwise compliment the image data from the image acquisition unit 120, or some processed variation or derivative of the image data from the image acquisition unit 120.

Figure 2A:
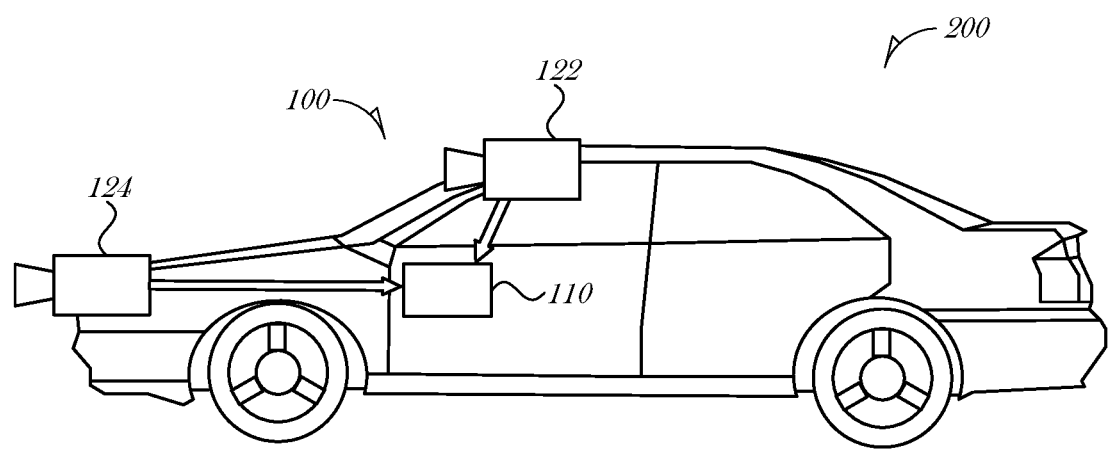
FIG. 2A is a diagrammatic side view representation of an exemplary vehicle including a system consistent with the disclosed embodiments.

System 100, or various components thereof, can be incorporated into various different platforms. In some embodiments, system 100 may be included on a vehicle 200, as shown in FIG. 2A. For example, vehicle 200 can be equipped with a processing circuit 110 and any of the other components of system 100, as described above relative to FIG. 1. While in some embodiments vehicle 200 can be equipped with only a single-image capture device (e.g., camera), in other embodiments, such as those discussed in connection with FIGS. 2B-2E, multiple image capture devices can be used. For example, either of image capture devices 122 and 124 of vehicle 200, as shown in FIG. 2A, can be part of an ADAS (Advanced Driver Assistance Systems) imaging set.

The image capture devices included on vehicle 200 as part of the image acquisition unit 120 can be positioned at any suitable location. In some embodiments, as shown in FIGS. 2A-2E and 3, image capture device 122 can be located in the vicinity of the rearview mirror. This position may provide a line of sight similar to that of the driver of vehicle 200, which can aid in determining what is and is not visible to the driver.

Other locations for the image capture devices of image acquisition unit 120 can also be used. For example, image capture device 124 can be located on or in a bumper of vehicle 200. Such a location can be especially suitable for image capture devices having a wide field of view. The line of sight of bumper-located image capture devices can be different from that of the driver. The image capture devices (e.g., image capture devices 122, 124, and 126) can also be located in other locations. For example, the image capture devices may be located on or in one or both of the side mirrors of vehicle 200, on the roof of vehicle 200, on the hood of vehicle 200, on the trunk of vehicle 200, on the sides of vehicle 200, mounted on, positioned behind, or positioned in front of any of the windows of vehicle 200, and mounted in or near light figures on the front and/or back of vehicle 200, etc. The image capture unit 120, or an image capture device that is one of a plurality of image capture devices that are used in an image capture unit 120, can have a field-of-view (FOV) that is different than the FOV of a driver of a vehicle, and not always see the same objects. In one example, the FOV of the image acquisition unit 120 can extend beyond the FOV of a typical driver and can thus image objects which are outside the FOV of the driver. In yet another example, the FOV of the image acquisition unit 120 is some portion of the FOV of the driver. In some embodiments, the FOV of the image acquisition unit 120 corresponding to a sector which covers an area of a road ahead of a vehicle and possibly also surroundings of the road.

In addition to image capture devices, vehicle 200 can be include various other components of system 100. For example, processing circuit 110 may be included on vehicle 200 either integrated with or separate from an engine control unit (ECU) of the vehicle. Vehicle 200 may also be equipped with a position sensor 130, such as a GPS receiver and may also include a map database 160 and memory units 140 and 150.

Figure 2B:
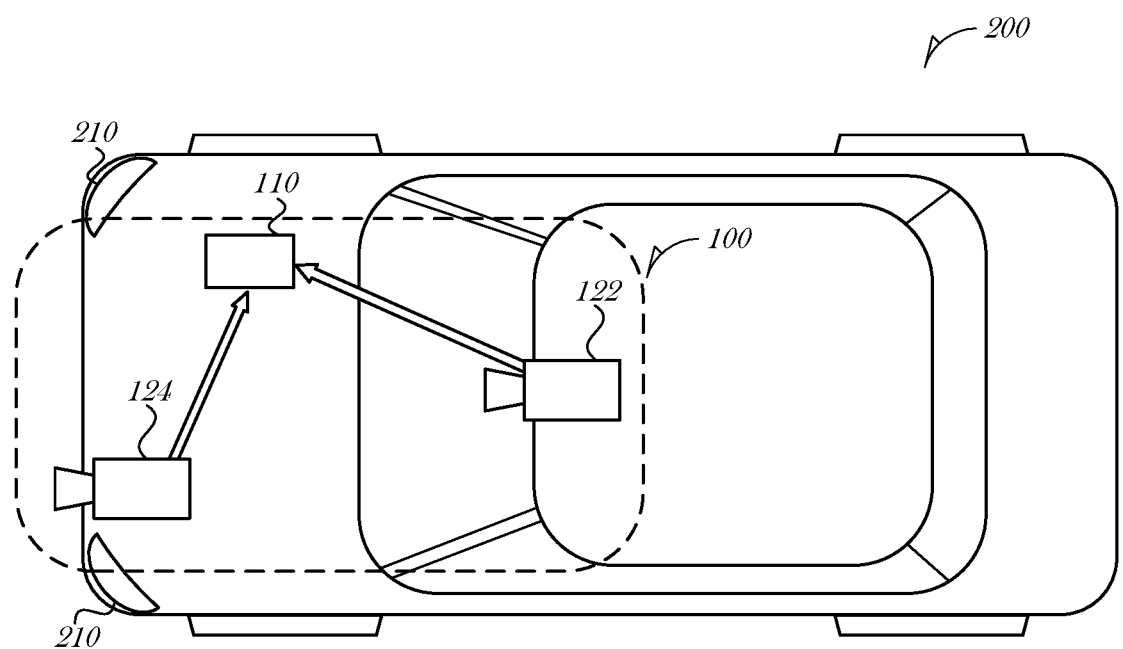
FIG. 2B is a diagrammatic top view representation of the vehicle and system shown in FIG. 2A consistent with the disclosed embodiments.

FIG. 2A is a diagrammatic side view representation of a vehicle imaging system according to examples of the presently disclosed subject matter. FIG. 2B is a diagrammatic top view illustration of the example shown in FIG. 2A. As illustrated in FIG. 2B, the disclosed examples can include a vehicle 200 including in its body a system 100 with a first image capture device 122 positioned in the vicinity of the rearview mirror and/or near the driver of vehicle 200, a second image capture device 124 positioned on or in a bumper region (e.g., one of bumper regions 210) of vehicle 200, and a processing circuit 110.

Figure 2C:
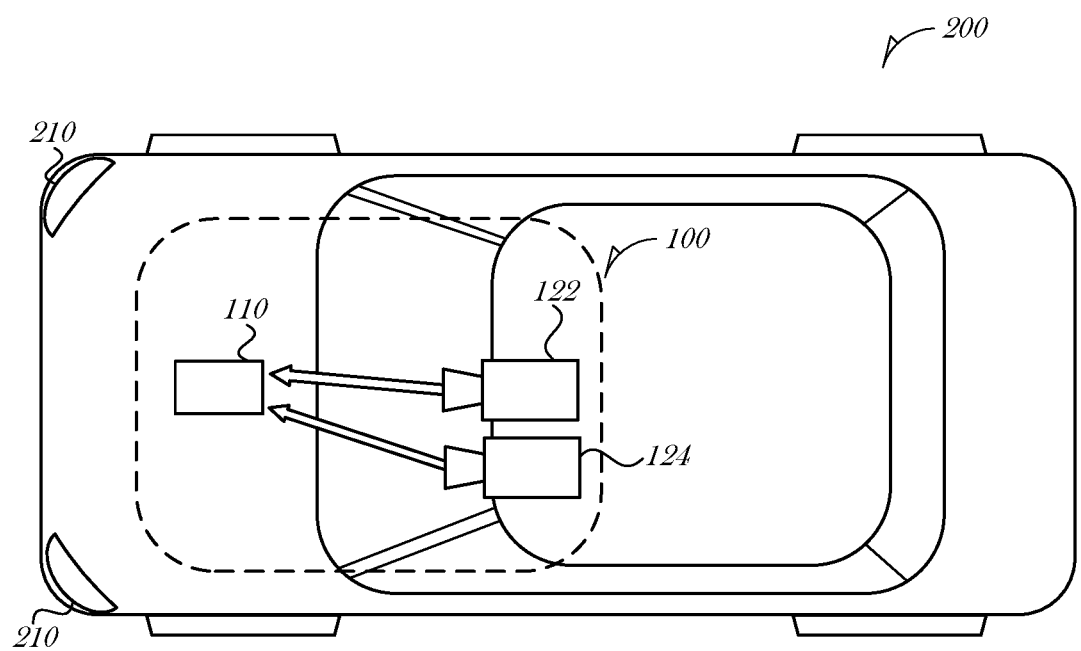
FIG. 2C is a diagrammatic top view representation of another embodiment of a vehicle including a system consistent with the disclosed embodiments.

As illustrated in FIG. 2C, image capture devices 122 and 124 may both be positioned in the vicinity of the rearview mirror and/or near the driver of vehicle 200. Additionally, while two image capture devices 122 and 124 are shown in FIGS. 2B and 2C, it should be understood that other embodiments may include more than two image capture devices. For example, in the embodiment shown in FIG. 2D, first, second, and third image capture devices 122, 124, and 126, are included in the system 100 of vehicle 200.

Figure 2D:
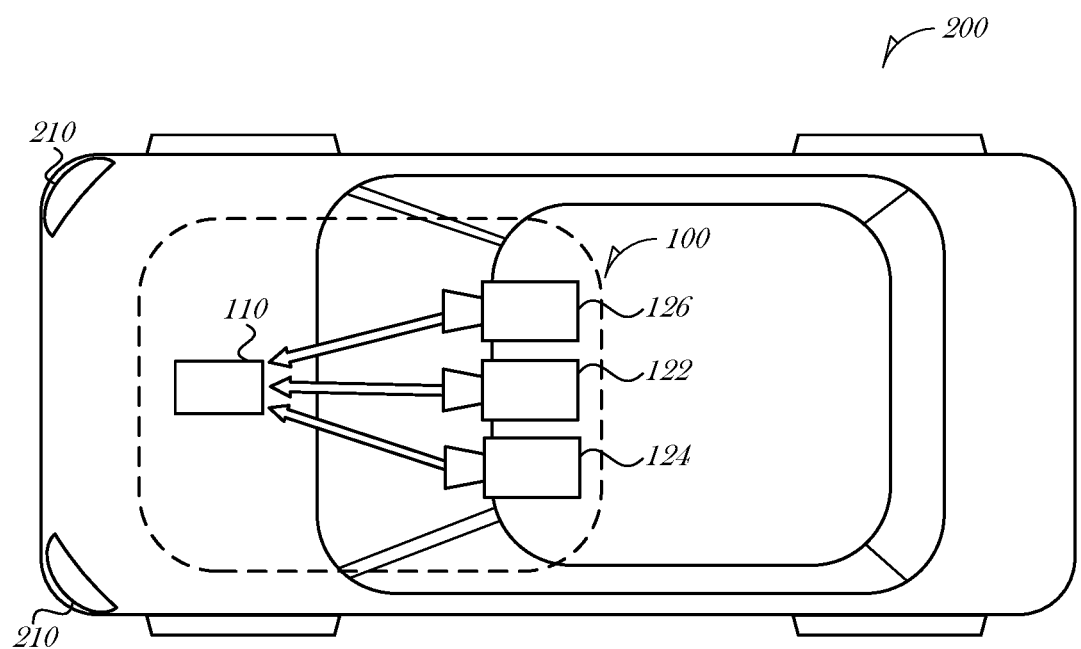
FIG. 2D is a diagrammatic top view representation of yet another embodiment of a vehicle including a system consistent with the disclosed embodiments.

As shown in FIG. 2D, image capture devices 122, 124, and 126 may be positioned in the vicinity of the rearview mirror and/or near the driver seat of vehicle 200. The disclosed examples are not limited to any particular number and configuration of the image capture devices, and the image capture devices may be positioned in any appropriate location within and/or on vehicle 200.

It is also to be understood that disclosed embodiments are not limited to a particular type of vehicle 200 and may be applicable to all types of vehicles including automobiles, trucks, trailers, motorcycles, bicycles, self-balancing transport devices and other types of vehicles.

The first image capture device 122 can include any suitable type of image capture device. Image capture device 122 can include an optical axis. In one instance, the image capture device 122 can include an Aptina M9V024 WVGA sensor with a global shutter. In another example, a rolling shutter sensor can be used. Image acquisition unit 120, and any image capture device which is implemented as part of the image acquisition unit 120, can have any desired image resolution. For example, image capture device 122 can provide a resolution of 1280×960 pixels and can include a rolling shutter.

Image acquisition unit 120, and any image capture device which is implemented as part of the image acquisition unit 120, can include various optical elements. In some embodiments one or more lenses can be included, for example, to provide a desired focal length and field of view for the image acquisition unit 120, and for any image capture device which is implemented as part of the image acquisition unit 120. In some examples, an image capture device which is implemented as part of the image acquisition unit 120 can include or be associated with any optical elements, such as a 6 mm lens or a 12 mm lens, for example. In some examples, image capture device 122 can be configured to capture images having a desired (and known) field-of-view (FOV).

The first image capture device 122 may have a scan rate associated with acquisition of each of the first series of image scan lines. The scan rate may refer to a rate at which an image sensor can acquire image data associated with each pixel included in a particular scan line.

Figure 2E:
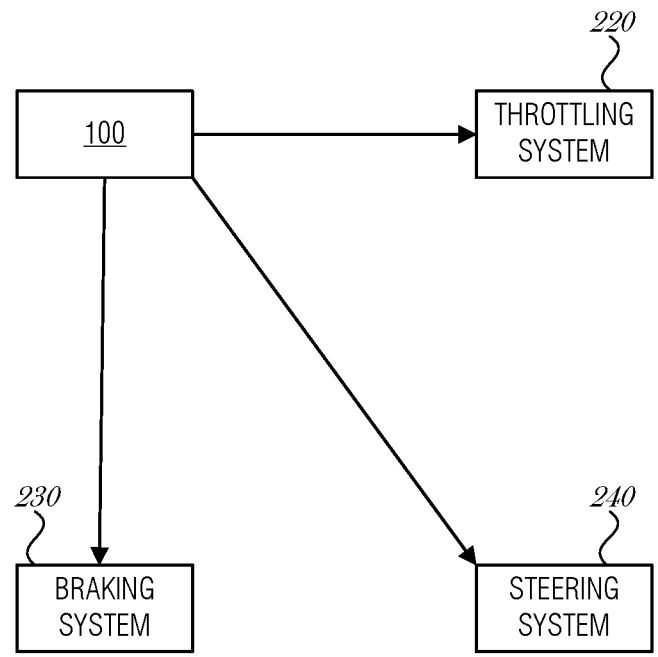
FIG. 2E is a diagrammatic representation of exemplary vehicle control systems consistent with the disclosed embodiments.

FIG. 2E is a diagrammatic representation of vehicle control systems, according to examples of the presently disclosed subject matter. As indicated in FIG. 2E, vehicle 200 can include throttling system 220, braking system 230, and steering system 240. System 100 can provide inputs (e.g., control signals) to one or more of throttling system 220, braking system 230, and steering system 240 over one or more data links (e.g., any wired and/or wireless link or links for transmitting data). For example, based on analysis of images acquired by image capture devices 122, 124, and/or 126, system 100 can provide control signals to one or more of throttling system 220, braking system 230, and steering system 240 to navigate vehicle 200 (e.g., by causing an acceleration, a turn, a lane shift, etc.). Further, system 100 can receive inputs from one or more of throttling system 220, braking system 230, and steering system 240 indicating operating conditions of vehicle 200 (e.g., speed, whether vehicle 200 is braking and/or turning, etc.).

Figure 3:
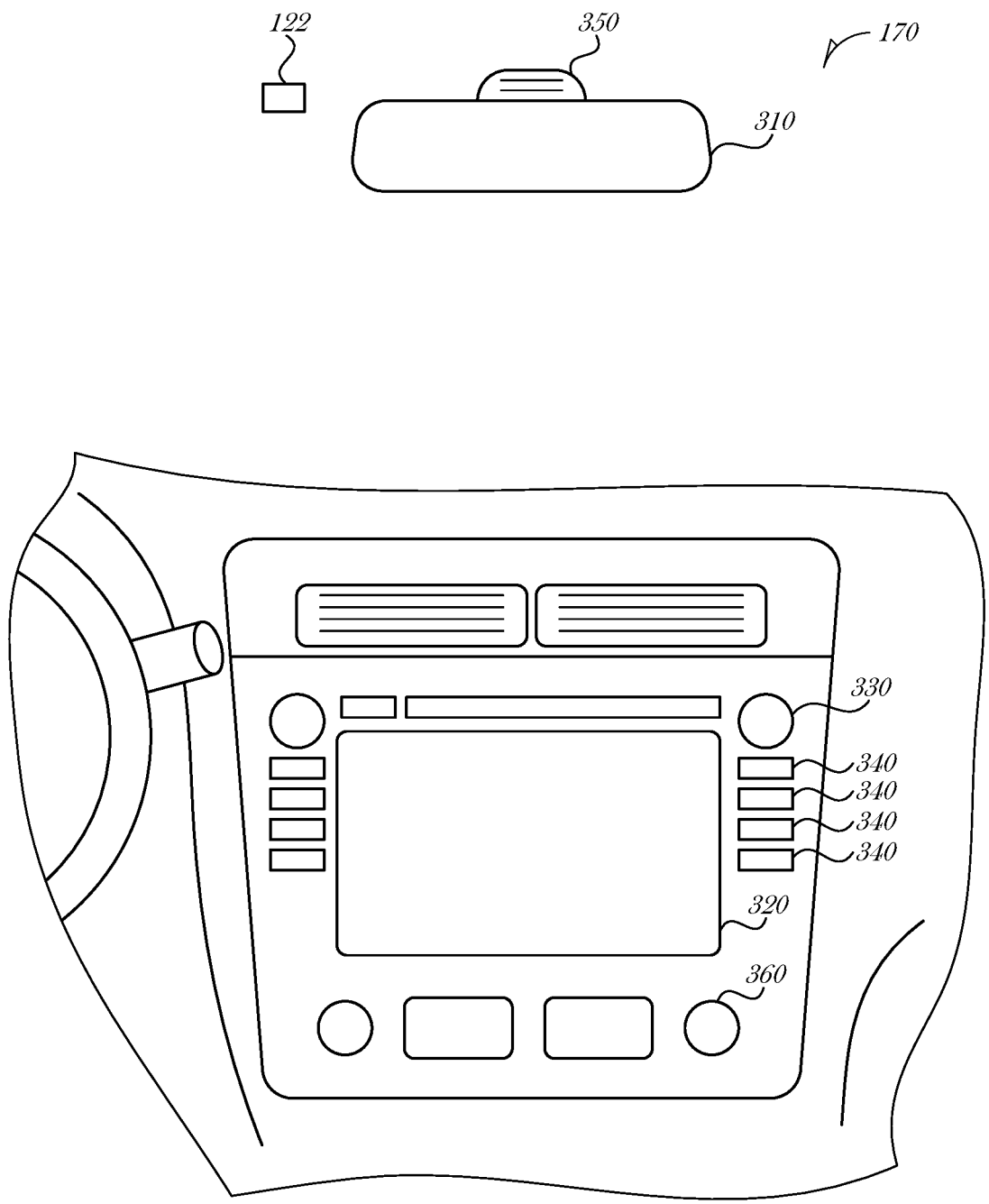
FIG. 3 is a diagrammatic representation of an interior of a vehicle including a rearview mirror and a user interface for a vehicle imaging system consistent with the disclosed embodiments.

As shown in FIG. 3, vehicle 200 may also include a user interface 170 for interacting with a driver or a passenger of vehicle 200. For example, user interface 170 in a vehicle application may include a touch screen 320, knobs 330, buttons 340, and a microphone 350. A driver or passenger of vehicle 200 may also use handles (e.g., located on or near the steering column of vehicle 200 including, for example, turn signal handles), buttons (e.g., located on the steering wheel of vehicle 200), and the like, to interact with system 100. In some embodiments, microphone 350 may be positioned adjacent to a rearview mirror 310. Similarly, in some embodiments, image capture device 122 may be located near rearview mirror 310. In some embodiments, user interface 170 may also include one or more speakers 360 (e.g., speakers of a vehicle audio system). For example, system 100 may provide various notifications (e.g., alerts) via speakers 360.

As will be appreciated by a person skilled in the art having the benefit of this disclosure, numerous variations and/or modifications may be made to the foregoing disclosed embodiments. For example, not all components are essential for the operation of system 100. Further, any component may be located in any appropriate part of system 100 and the components may be rearranged into a variety of configurations while providing the functionality of the disclosed embodiments. Therefore, the foregoing configurations are examples and, regardless of the configurations discussed above, system 100 can provide a wide range of functionality to analyze the surroundings of vehicle 200 and, in response to this analysis, navigate and/or otherwise control and/or operate vehicle 200. Navigation, control, and/or operation of vehicle 200 may include enabling and/or disabling (directly or via intermediary controllers, such as the controllers mentioned above) various features, components, devices, modes, systems, and/or subsystems associated with vehicle 200. Navigation, control, and/or operation may alternately or additionally include interaction with a user, driver, passenger, passerby, and/or other vehicle or user, which may be located inside or outside vehicle 200, for example by providing visual, audio, haptic, and/or other sensory alerts and/or indications.

As discussed below in further detail and consistent with various disclosed embodiments, system 100 may provide a variety of features related to autonomous driving, semi-autonomous driving and/or driver assist technology. For example, system 100 may analyze image data, position data (e.g., GPS location information), map data, speed data, and/or data from sensors included in vehicle 200. System 100 may collect the data for analysis from, for example, image acquisition unit 120, position sensor 130, and other sensors. Further, system 100 may analyze the collected data to determine whether or not vehicle 200 should take a certain action, and then automatically take the determined action without human intervention. It would be appreciated that in some cases, the actions taken automatically by the vehicle are under human supervision, and the ability of the human to intervene adjust abort or override the machine action is enabled under certain circumstances or at all times. For example, when vehicle 200 navigates without human intervention, system 100 may automatically control the braking, acceleration, and/or steering of vehicle 200 (e.g., by sending control signals to one or more of throttling system 220, braking system 230, and steering system 240). Further, system 100 may analyze the collected data and issue warnings, indications, recommendations, alerts, or instructions to a driver, passenger, user, or other person inside or outside of the vehicle (or to other vehicles) based on the analysis of the collected data. Additional details regarding the various embodiments that are provided by system 100 are provided below.

Configurable processing circuits (hereinafter "processing circuits") may be arranged to execute a program, be reconfigured, and following the configuration, execute another program or execute the same program with other parameters or variables.

The configuration process of a processing circuit may include receiving configuration information that includes alternating address and data segments. A segment may include multiple bits. For each pair of address segment and data segment, the data is written to memory entry addressable via the address.

A processing circuit may require a significant amount of configuration information, especially when the processing circuit includes multiple configurable processing circuits.

The memory space that may store the configuration information may be large, and the address segment may be relatively long. For example, an address segment may be 32 bits long. This may limit the number of headers and/or address segments that may be written to the processing circuit per cycle. For example, if the processing circuit is accessed by a 64 bit long bus then up to two segments (or up to a header and a single data segment) may be written to the processing circuit per cycle.

Accordingly, the configuration period may be relatively long and thus reduce the overall throughput of the processing circuit.

There may be provided a system, a method, and a computer readable medium that compress the configuration information to provide compressed configuration information—in order to speed up the configuration process. The compression may provide a compressed configuration information data structure (CCDS).

There may be provided a system, a method and a computer readable medium that decompress the CCDS in a fast and simple manner.

During the execution of the program, the processing circuit may write some of the configuration information and/or amend some of the configuration information. For example, the processing circuit may be arranged to update a value of a counter, or any other value that may reflect an outcome of the program and/or a progress of the program, and the like.

There may be provided a system, a method and a computer readable medium that maintain the simplicity of access by the processing circuit to the configuration information (even in a compressed form), and in particular, doing so such that the processing circuit is not allocating resources for finding the location (within a compressed configuration information) of an entry that should be updated or written to.

Such access by the processing circuit to the configuration information can be achieved by implementing a compression process that is a size-preserving compression process. A size-preserving compression process maintains a size of the units of the multiple units sequences. Thus, the location of an updated unit remains the same (located at the same location as the original unit before the update), regardless of the compression. The processing circuit may access the unit without needing to perform complex location calculations of the memory entry it has to write to and/or update.

There may be provided a system, a method, and a computer readable medium that may provide a CCDS that is backward compatible in the sense that the same structure of fixed size units is used in non-compressed configuration information (in cases where there is no need to compress the configuration information) and in the CCDS.

Figure 4:
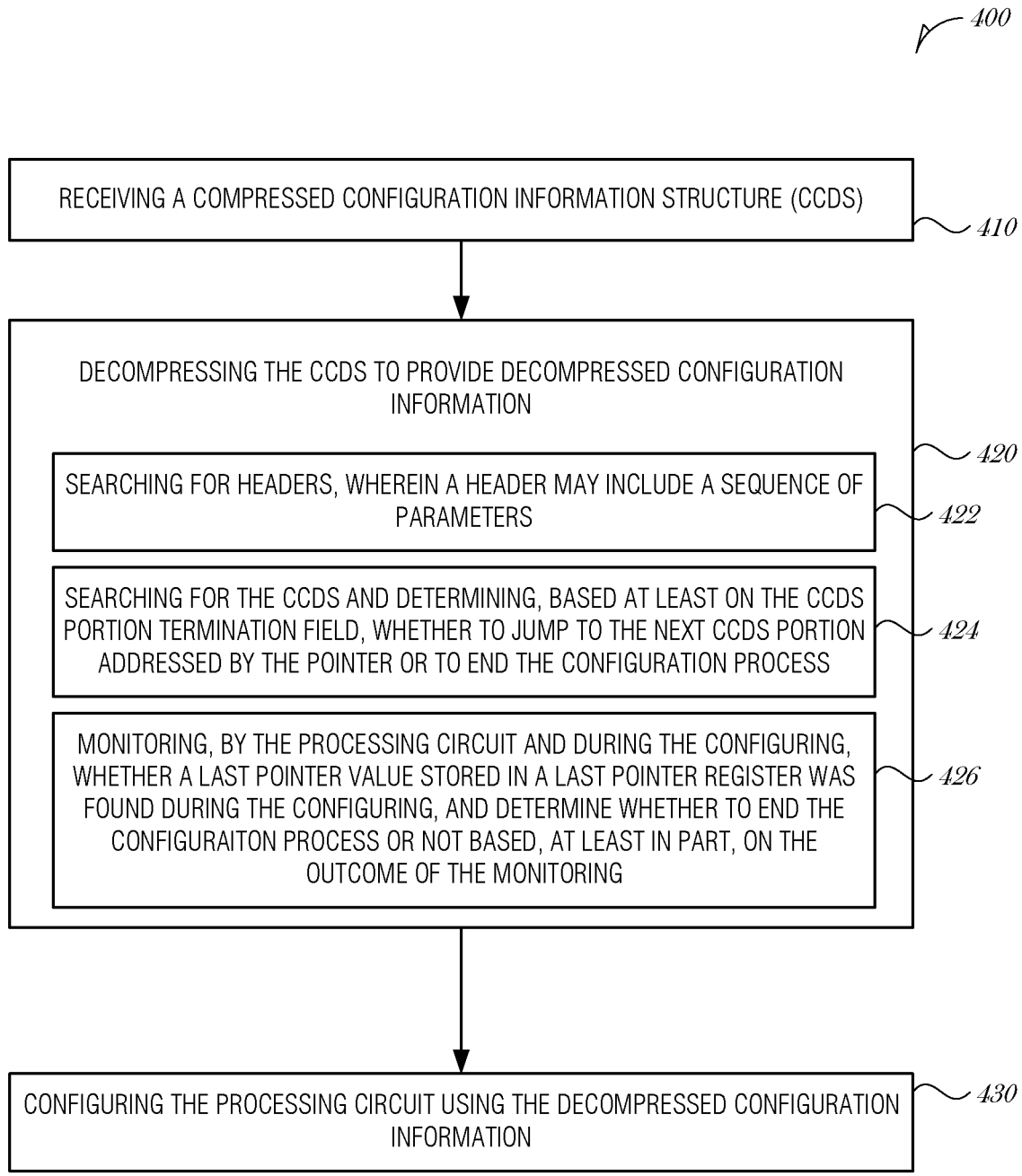
FIG. 4 illustrates an example of a method.

FIG. 4 illustrates method 400 for configuring a processing circuit.

Method 400 may include steps 410, 420 and 430.

Step 410 may include receiving, by the processing circuit, a compressed configuration information structure (CCDS). The CCDS may include multiple sequences. The CCDS is generated by a size-preserving compression process that maintains a size of the segments of the multiple units sequences.

A header of the CCDS may be followed by one or more data segments to form a sequence.

There are various types of sequences. Some types may include a predefined number of data segments, and some other types may include a variable number of data segments. A header of any of the variable number of data segments may include sequence length information.

Step 410 may be followed by step 420 of decompressing the CCDS, by the processing circuit, to provide decompressed configuration information.

Step 420 may include step 422 of searching for headers, wherein a header may include sequence parameters. The sequence parameters may include at least one out of a length, an address, and a type.

The searching may include scanning the CCDS, finding a first header (which may be located at a known location such as the start of the CCDS), and based on explicit or implicit length information about the length of the sequence, jumping to the next header. In the case of a fixed type sequence, the length information is implicit. In the case of a variable length sequence, the length information may be explicit, for example, it may be included in the header.

Step 420 may be followed by step 430 of configuring the processing circuit using the decompressed configuration information. The configuring may be executed based on the headers.

Steps 420 and 430 may be executed in an iterative manner of finding a header, configuring the processing circuit using the header and one or more data segments that are associated with the header, and then searching for the next header.

The header may include a type identifier that may include a type group identifier that identifies a group of types of sequences to which the sequence belongs, and an inter-group identifier that identifies a type of the sequence out of types that belong to the group of types.

For example, the types of sequences may include at least some out of: (a) a header followed by a single data segment, (b) a header followed by a predefined number of data segments targeted to multiple addresses, (c) a header followed by a variable number of data segments targeted to multiple addresses, (d) a header followed by a predefined number of data segments targeted to a same address, (e) a header followed by a variable number of data segments targeted to a same address, (f) a header that includes a bitmap associated with a range of addresses, and also include one or more values to be written to one or more of the range of addresses, and (g) a header that may include a mask followed by a data segment, wherein the mask defined a relevancy of parts of the data segment.

The types of sequences may also differ from each other by the size of relevant data of the data segment. The entire data segment (for example 32 bits) may be relevant and be used to configure the processing circuit. Alternatively, only a part of the data segment (for example 16 bits) may be relevant and be used to configure the processing circuit.

A sequence may include a header followed by a single data segment, whereas the written data is of a first size or of a second size (for example, 16 bits out of 32 bits, all 32 bits or any other number of bits).

Types (a)-(c) may belong to a first group, and types (d)-(g) may belong to another group.

The types of the sequences may differ from those illustrated above. The types may be grouped to any number of groups and be allocated to groups in any other manner. There may be any number of types of sequences.

The CCDS may include CCDS portions. The CCDS portions may include multiple headers and multiple data segments. The CCDS may be of a fixed length or variable length.

The CCDS portions may be arranged in various manners; for example, the portions may form a linked list.

Each CCDS portion may include a CCDS portion termination field that may include an end of CCDS indication or a pointer to a next CCDS portion of the CCDS.

Step 420 may include step 424 of searching for the CCDS and determining, based at least on the CCDS portion termination field, whether to jump to the next CCDS portion addressed by the pointer or to end the configuration process.

In order to enable updates of the CCDS during the configuration process (while reading the CCDS or even after reading the CCDS), an atomic-like update process of the CCDS may be provided.

The atomic-like update process may guarantee that the configuration process will be aware of the update to the CCDS, regardless of the progress of the configuration process.

For example—step 626 may include continuing the configuring until reaching an end of CCDS indication that followed a pointer of the next CCDS portion of the last pointer value.

For example, step 426 may include continuing the configuring until reaching an end of CCDS indication that followed a pointer of the next CCD portion of the last pointer value.

The header may include a type identifier that identifies a sequence as being at least one out of (a) a header followed by a single data segment, (b) a header followed by a predefined number of data segments targeted to multiple addresses, (c) a header followed by a variable number of data segments targeted to multiple addresses, (d) a header followed by a predefined number of data segments targeted to a same address, (e) a header followed by a variable number of data segments targeted to a same address, (f) a header that includes a bitmap associated with a range of addresses, and also include one or more values to be written to one or more of the range of addresses, and (g) a header that may include a mask followed by a data segment, wherein the mask defined a relevancy of parts of the data segment.

Figure 5:
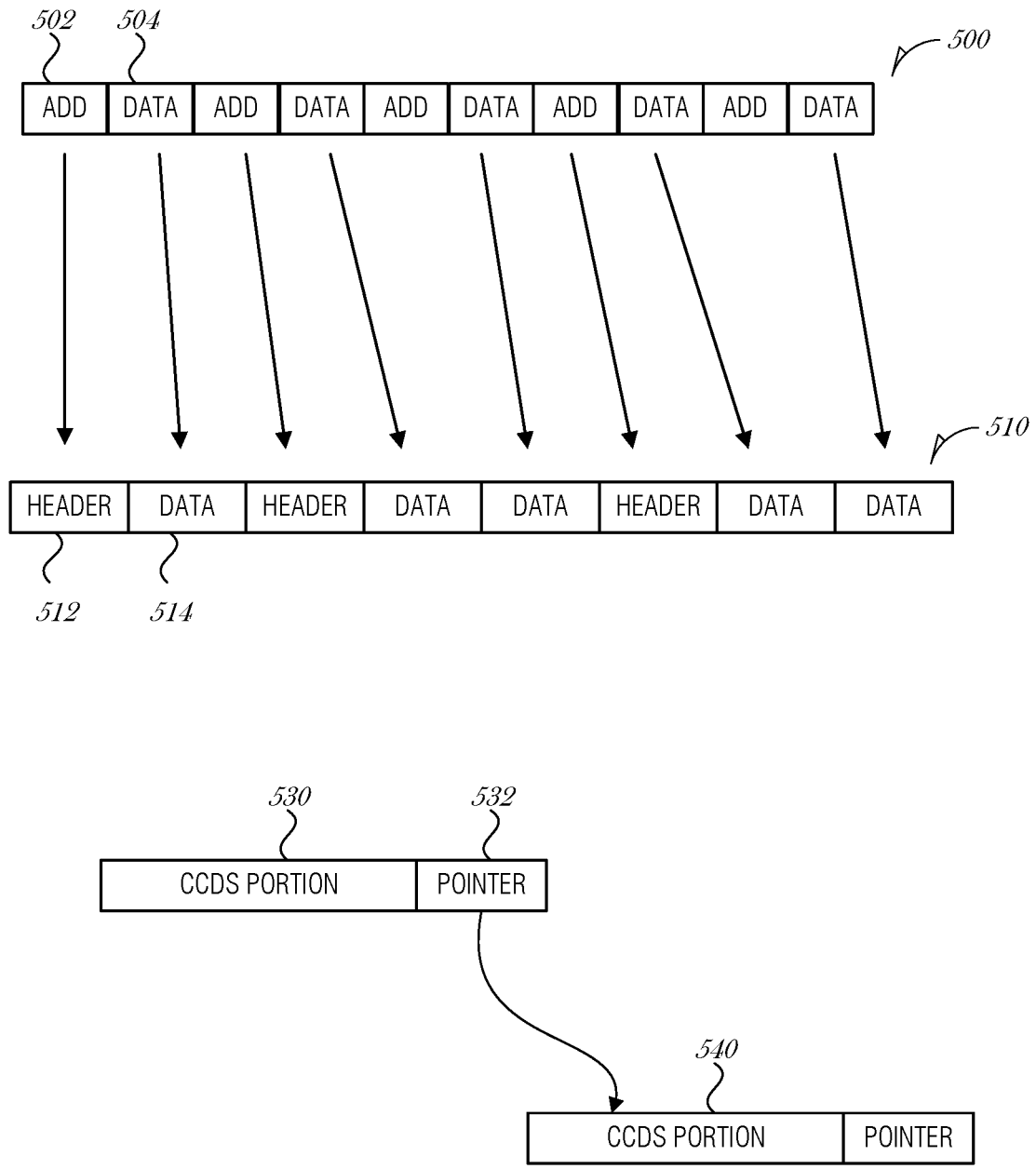
FIG. 5 illustrates an example of a compressing of a configuration information sequence.

FIG. 5 illustrates a compressing of a configuration information sequence 500 to provide a CCDS 510.

Configuration information sequence 500 includes five pairs of (a) an address segment ("ADD") 502 and (b) a data segment ("DATA") 504.

CCDS 510 includes three headers ("HEADER") 512 and five data segment ("DATA") 514.

The size of the headers 512 equals the size of the address segments 502.

CCDS 510 has fewer headers (in relation to configuration information sequence 500) and thus is regarded as a compressed version of the configuration information sequence 500.

It should be noted that CCDS 510 may include multiple CCDS portions (such as 530 and 540) that may be arranged in various ways, such as in a linked list. Each CCDS portion may include a CCDS portion termination field that may include an end of CCDS indication or a pointer (532) to a next CCDS portion of the CCDS. An end indication may indicate that the CCDS ended. A pointer may point to a next CCDS portion. The pointer and/or the end indicators may belong to a header and have a unique value.

Figure 6:
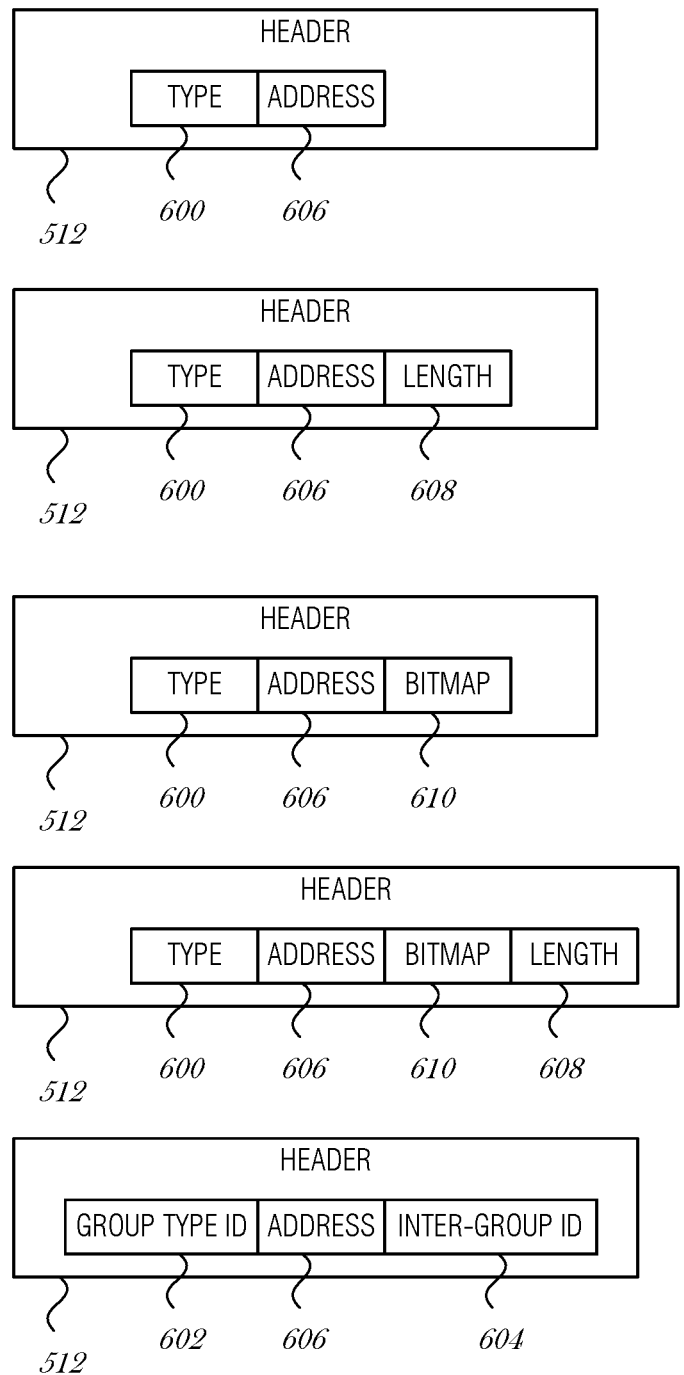
FIG. 6 illustrates various examples of fields that may be included in a header.

FIG. 6 illustrates various example of fields that may be included in a header 512:

a. A type field 600.
  b. A group type identifier 602.
  c. An inter-group identifier 604.
  d. An address field 606. The address field may be a base address that stores data to be modified during the configuration. If multiple data segments follow the header the addresses of the second till last memory entries may be determined in a manner that is predefined and/or indicated in the header.
  e. A length field 608 that indicates the length of the sequence—number of data segments that follow the header.

f. A bitmap 610 that identifies memory addresses out of a range of memory addresses that should be updated.

Figure 7:
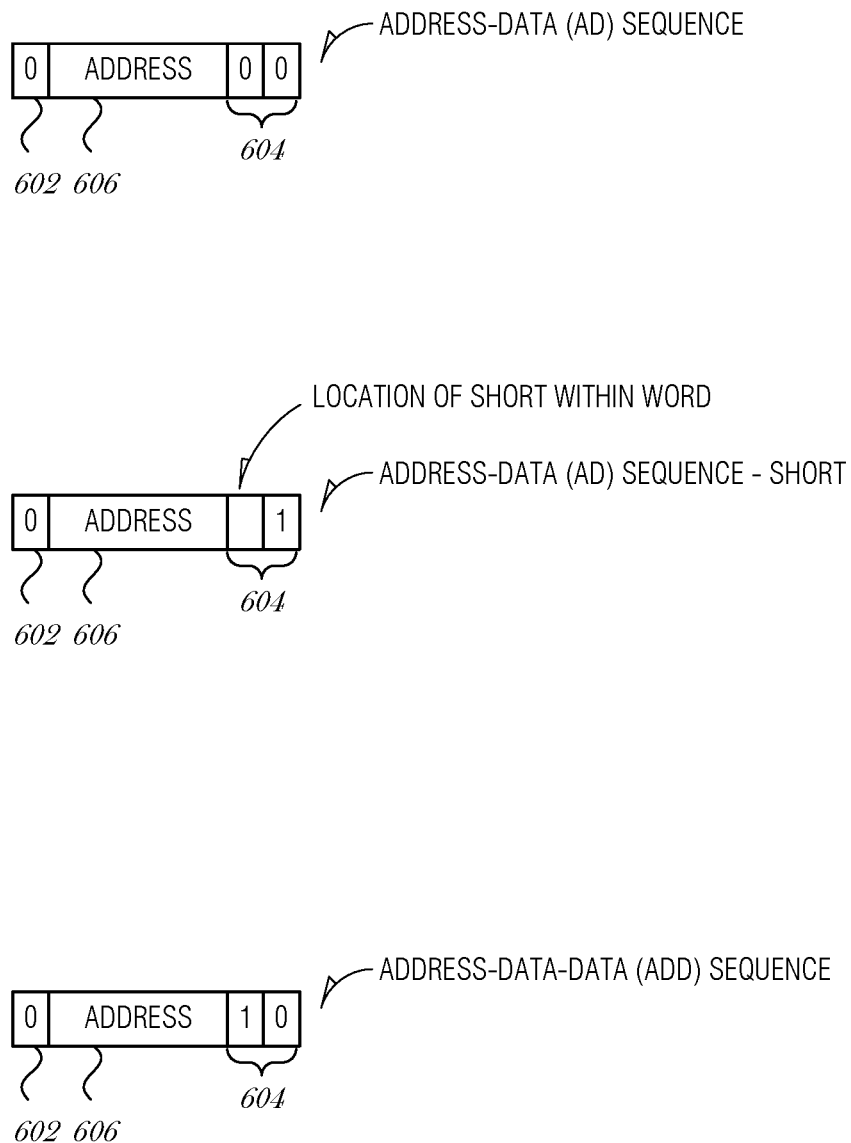
FIG. 7 illustrates example of various headers of a first group of sequences.

FIG. 7 illustrates example of various headers of a first group of sequences.

Members of the first group are identified by a reset group type identifier 602.

A header may also include two bits (for example two least significant bits) the form an inter-group identifier 604:
a. A combination of "00" indicates that the sequence includes a header followed by a single data segment. The entire data segments is relevant.
b. A combination of "XO" indicates that the sequence includes a header followed by a single data segment. Half of the data segments is relevant, and the "X" bit indicate whether the relevant half is the upper half or the lower half
c. A combination "10" indicates that the sequence includes a header followed by two data segments.

Figure 8:
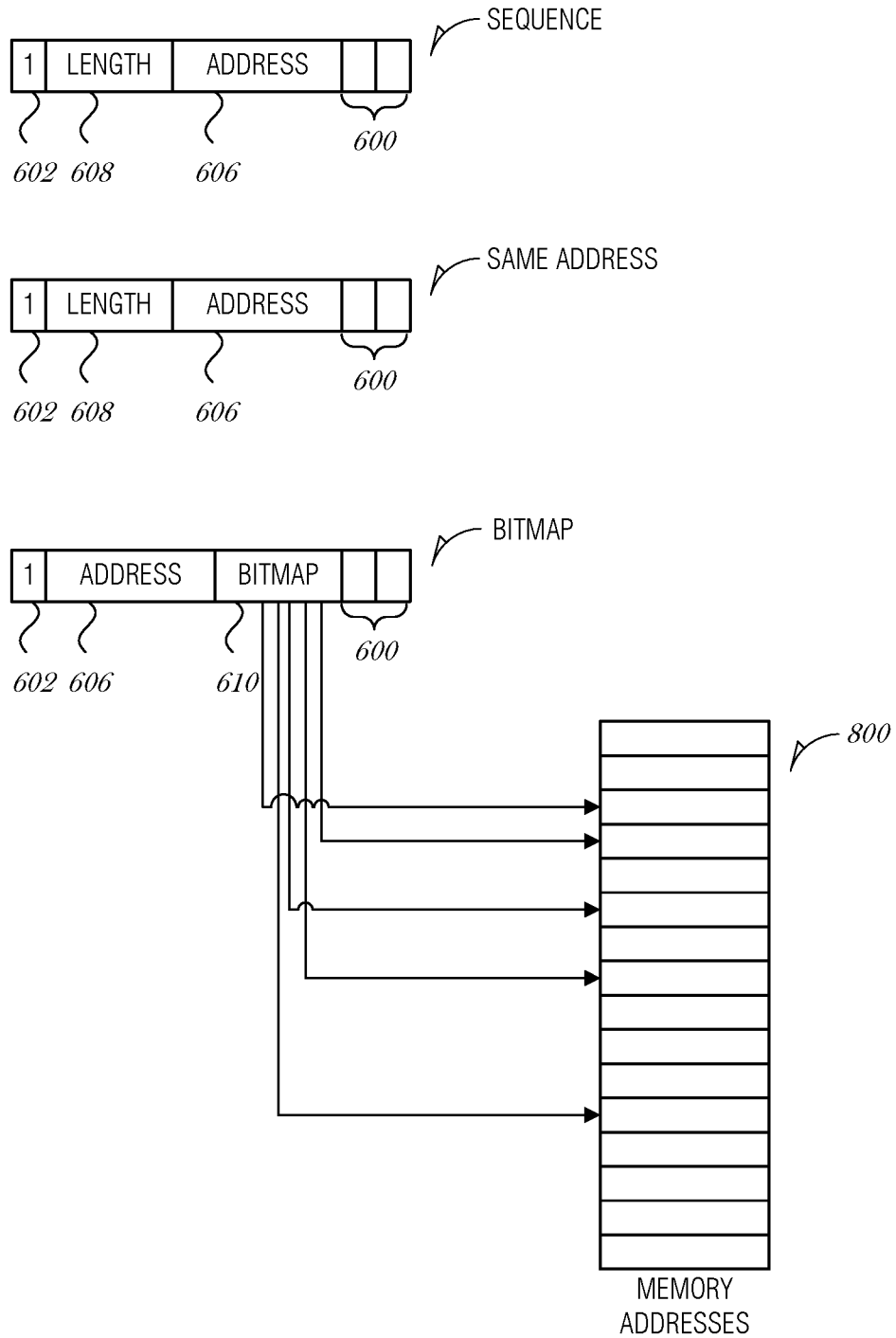
FIG. 8 illustrates example of various headers of a second group of sequences.

FIG. 8 illustrates examples of various headers of a second group of sequences.

Members of the first group are identified by a set group type identifier 602.

Figure 9:
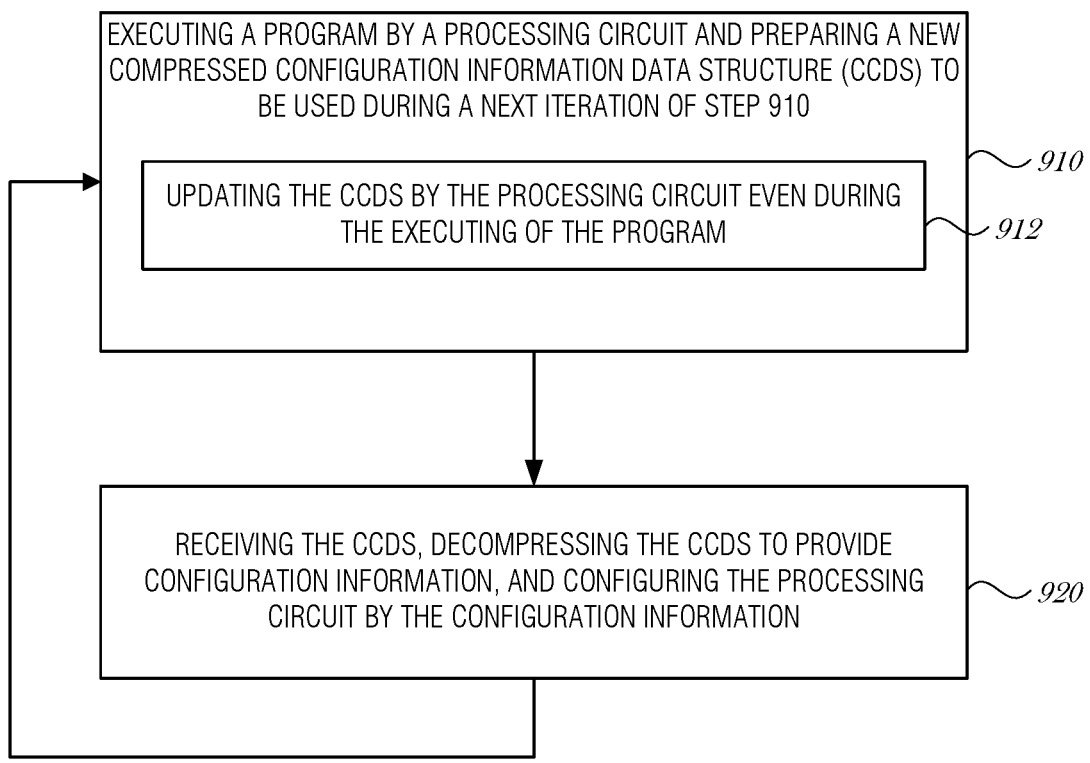
FIG. 9 illustrates an example of a method.

The header may also include two bits (for example two least significant bits) the form an inter-group identifier 604:
a. A first combination of said two bits may identify the sequence as including a variable number of data segments that follow the header. The number of data segments is identified in length field 608. Different data segments are written to different addresses.
b. A second combination of said two bits may identify the sequence as including a variable number of data segments that follow the header. The number of data segments is identified in length field 608. Different data segments are written to the same address. The address may be of a configuration circuit that may be accessed using a single address. This may be used for configuring multiple interconnects concurrently.
c. A third combination of said two bits may identify the sequence as including up to a predefined number of data segments (determined by the length of the bitmap) and that the header includes a bitmap 610 associated with a range of addresses 800, and also include one or more values to be written to one or more of the range of addresses 800. This may be used for selecting which counters of a group of counters will be reconfigured. In FIG. 9, five out of sixteen bits of the bitmap indicate that their corresponding address should be updated.

FIG. 9 illustrates an example of a method 900 for configuring and processing.

Method 900 may start by step 910 of executing a program by a processing circuit and preparing a new compressed configuration information data structure (CCDS) to be used during a next iteration of step 890.

Step 910 may include step 912 of updating the CCDS by the processing circuit even during the executing of the program.

Once step 910 is completed it may be followed by step 920 of receiving the CCDS, decompressing the CCDS to provide configuration information, and configuring the processing circuit by the configuration information.

Step 920 may be followed by jumping to step 910 for executing the same program as in the previous iteration of step 910 or executing a new program.

Figure 10:
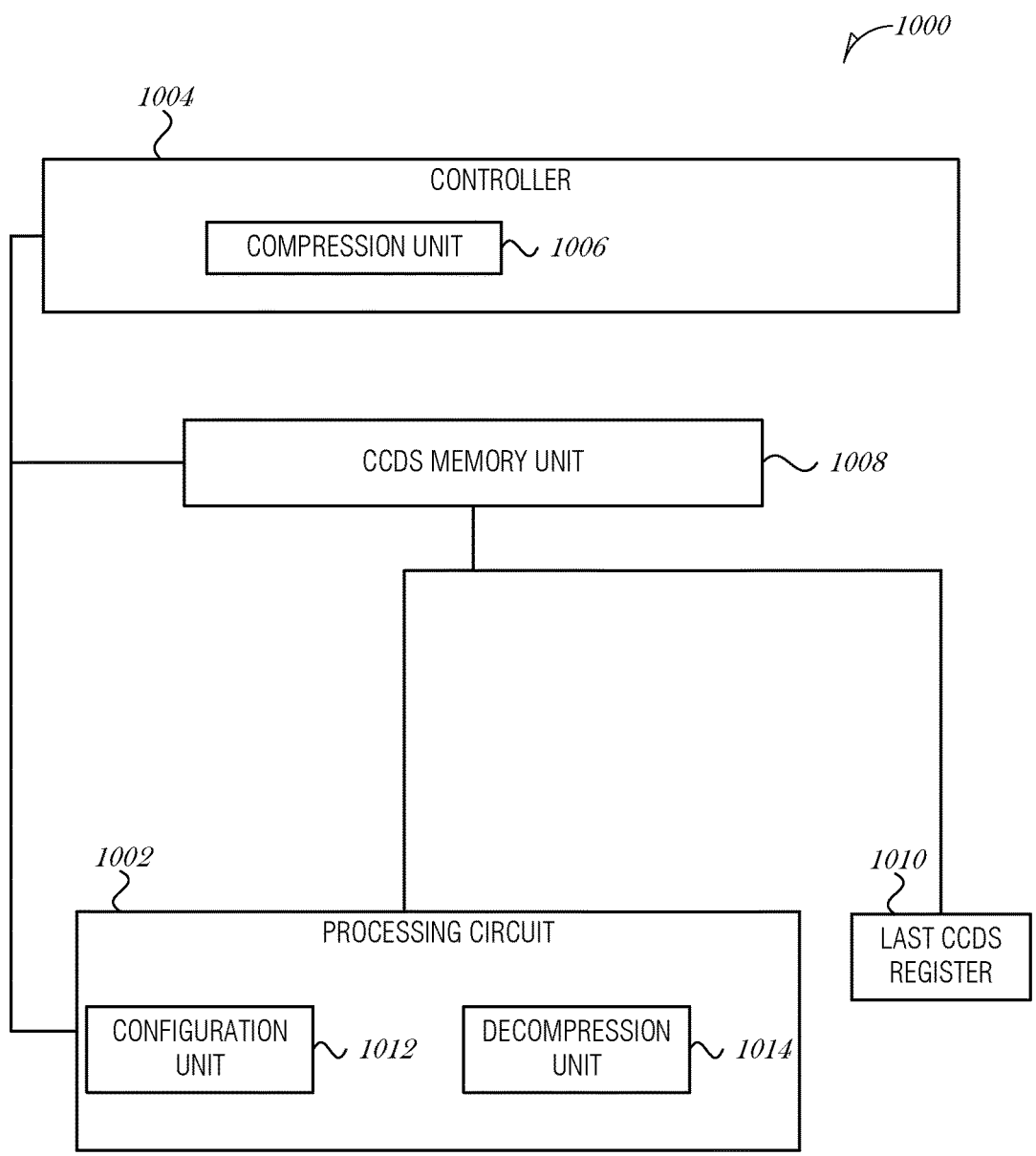
FIGS. 10 and 11 illustrate examples of a system.
Figure 11:
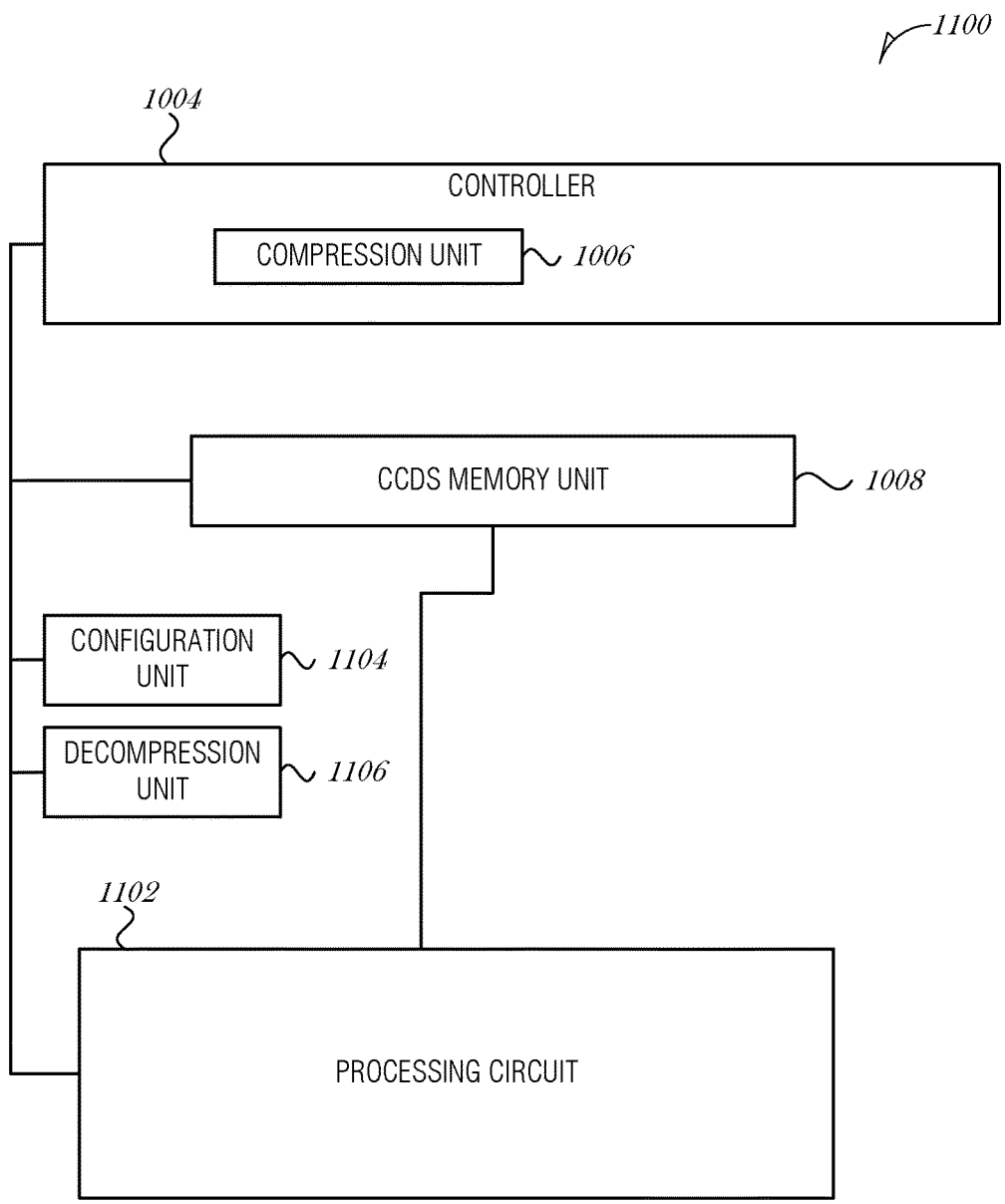

FIGS. 10 and 11 illustrate examples of systems 1000 and 1100 respectively.

Systems 1000 and 1100 may be configured to execute method 400 and/or method 900.

Systems 1000 and 1100 may be an integrated circuit, may include one or more integrated circuits, may be a part of an integrated circuit, and the like.

System 1000 includes a processing circuit 1002, a controller 1004, a compression unit 1006, a CCDS memory unit 1008 and a last CCDS register 1010.

The processing circuit 515 includes decompression unit 1014 and configuration unit 1012.

The decompression unit 1014 may be configured to decompress CCDS to provide configuration information.

The configuration unit 1012 may configure the processing circuit 1002 based on the configuration information.

CCDS memory unit 1008 is configured to store the CCDS. Compression unit 1006 is configured to compress configuration information to generate CCDS. Controller 1004 may control the configuration process and/or may generate the CCDS.

The CCDS stored in CCDS memory unit 1008 may be accessed by controller 1004 and by processing circuit 1002. This enables the processing circuit 1002 to update the CCDS during execution of a program.

The last CCDS register 1010 may be arranged to store the CCDS portion termination field.

System 1100 includes a processing circuit 1102, a controller 1004, a compression unit 1006, and a CCDS memory unit 1008. System 1100 does not include last CCDS register 1010. In system 1100, the decompression unit 1104 and the CCDS memory unit 1106 are not part of the processing circuit 1102. Instead, they may be implemented in hardware components other than the processing circuit. For example, the decompression unit 1104 and the CCDS memory unit 1106 may be located at one or more other integrated circuits.

The processing circuit 1002, 1102 may be a hardware accelerator, a general purpose processor, a central processing unit, a system on chip, an image processor, a field programmable gate array (FPGA), an application specific integrated network, an application specific integrated circuit (ASIC), and the like.

Any of method describing steps may include more steps than those illustrated in the figure, only the steps illustrated in the figure or substantially only the steps illustrate in the figure. The same applies to components of a device, processor or system and to instructions stored in any non-transitory computer readable storage medium.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as flash memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing circuit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method for configuring a processing circuit, the method comprising:
    receiving, by the processing circuit, a compressed configuration information data structure (CCDS) that comprises multiple segments, wherein the CCDS was generated by a size-preserving compression process that maintains a size of the multiple segments; and
    decompressing the CCDS, by the processing circuit, to provide decompressed configuration information, wherein the decompressing comprises:
        searching for headers, wherein a header comprises sequence parameters, wherein the sequence parameters comprise at least one out of a length, an address field, and a type; and
        configuring the processing circuit using the decompressed configuration information, wherein the configuring is executed based on the headers.

2. The method according to claim 1, wherein a length of a header equals a length of an address segment of the decompressed configuration information.

3. The method according to claim 1, wherein at least two types of sequences differ from each other by a number of data segments.

4. The method according to claim 1, wherein a type of a sequence that comprises a header is identified by (a) a type group identifier that identifies a group of types to sequences to which the sequence belongs, and (b) an inter-group identifier that identifies a type of the sequence out of types that belong to the group of types.

5. The method according to claim 1, wherein a sequence has a type that is selected out of: (a) a sequence comprising a header followed by a single data segment, (b) sequence comprising a header followed by a predefined number of data segments targeted to multiple addresses, (c) a sequence comprising a header followed by a variable number of data segments targeted to multiple addresses, (d) a sequence comprising a header followed by a predefined number of data segments targeted to a same address, (e) a sequence comprising a header followed by a variable number of data segments targeted to a same address, (f) a sequence comprising a header that includes a bitmap associated with a range of addresses, and also include one or more values to be written to one or more of the range of addresses, and (g) a sequence comprising a header that includes a mask followed by a data segment, wherein the mask defined a relevancy of parts of the data segment.

6. The method according to claim 1, wherein each sequence (i) comprises a header and one or more data segments, and (ii) has a type, wherein types of different sequences differ from each other by a size of relevant data of each data segment of the sequence.

7. The method according to claim 1, wherein the CCDS comprises CCDS portions, wherein each CCDS portion comprises a CCDS portion termination field that comprises an end of CCDS indication or a pointer to a next CCDS portion of the CCDS.

8. The method according to claim 7, comprising:
    monitoring, by the processing circuit and during the configuring, whether a last pointer value stored in a last pointer register was found during the configuring; and
    continuing the configuring until reaching an end of CCDS indication that followed a pointer of the next CCDS portion of the last pointer value.

9. The method according to claim 1, wherein the configuring comprises:
    identifying that a sequence has a header that comprises a bitmap associated with a range of addresses; and
    writing one or more values to one or more addresses of the range of addresses that are identified as relevant addresses by the bitmap.

10. The method according to claim 9, wherein the one or more values are values of counters.

11. The method according to claim 1, comprising executing a program, by the processing circuit, following the configuring.

12. The method according to claim 1, comprising updating a next non-compressed configuration information structure by the processing circuit.

13. A non-transitory computer readable medium for configuring a processing circuit, the non-transitory computer readable medium stores instructions, which when executed by a machine, cause the machine to perform operations comprising:
    receiving, by the processing circuit, a compressed configuration information data structure (CCDS) that comprises multiple segments, wherein the CCDS was generated by a size-preserving compression process that maintains a size of the segments; and
    decompressing the CCDS, by the processing circuit, to provide decompressed configuration information, wherein the decompressing comprises:
        searching for headers, wherein a header comprises sequence parameters, wherein the sequence parameters comprise at least one out of a length, an address field, and a type; and
        configuring the processing circuit using the decompressed configuration information, wherein the configuring is executed based on the headers.

14. The non-transitory computer readable medium according to claim 13, wherein a length of a header equals a length of an address segment of the decompressed configuration information.

15. The non-transitory computer readable medium according to claim 13, wherein at least two types of sequences differ from each other by a number of data segments.

16. The non-transitory computer readable medium according to claim 13, wherein a type of a sequence that comprises a header is identified by (a) a type group identifier that identifies a group of types to sequences to which the sequence belongs, and (b) an inter-group identifier that identifies a type of the sequence out of types that belong to the group of types.

17. The non-transitory computer readable medium according to claim 13, wherein a sequence has a type that is selected out of: (a) a sequence comprising a header followed by a single data segment, (b) a sequence comprising a header followed by a predefined number of data segments targeted to multiple addresses, (c) a sequence comprising a header followed by a variable number of data segments targeted to multiple addresses, (d) a sequence comprising a header followed by a predefined number of data segments targeted to a same address, (e) a sequence comprising a header followed by a variable number of data segments targeted to a same address, (f) a sequence comprising a header that includes a bitmap associated with a range of addresses, and also include one or more values to be written to one or more of the range of addresses, and (g) a sequence comprising a header that includes a mask followed by a data segment, wherein the mask defined a relevancy of parts of the data segment.

18. The non-transitory computer readable medium according to claim 13, wherein each sequence (i) comprises a header and one or more data segments, and (ii) has a type, wherein types of different sequences differ from each other by a size of relevant data of each data segment of the sequence.

19. The non-transitory computer readable medium according to claim 13, wherein the CCDS comprises CCDS portions, wherein each CCDS portion comprises an CCDS portion termination field that comprises an end of CCDS indication or a pointer to a next CCDS portion of the CCDS.

20. The non-transitory computer readable medium according to claim 19, wherein the operations comprise monitoring, by the processing circuit and during the configuring, whether a last pointer value stored in a last pointer register was found during the configuring, and continuing the configuring until reaching an end of CCDS indication that followed a pointer of the next CCDS portion of the last pointer value.

21. The non-transitory computer readable medium according to claim 13, wherein configuring comprises:
identifying that a sequence has a header that comprises a bitmap associated with a range of addresses; and
writing one or more values to one or more addresses of the range of addresses that are identified as relevant addresses by the bitmap.

22. The non-transitory computer readable medium according to claim 21, wherein the one or more values are values of counters.

23. The non-transitory computer readable medium according to claim 13, wherein the operations comprise executing a program, by the processing circuit, following the configuring.

24. The non-transitory computer readable medium according to claim 13, wherein the operations comprise updating a next non-compressed configuration information structure by the processing circuit.

* * * * *

UNITED STATES PATENT AND TRADEMARK OFFICE
CERTIFICATE OF CORRECTION

| | |
|---|---|
| PATENT NO. | : 12,020,041 B2 |
| APPLICATION NO. | : 17/747452 |
| DATED | : June 25, 2024 |
| INVENTOR(S) | : Srebnik et al. |

It is certified that error appears in the above-identified patent and that said Letters Patent is hereby corrected as shown below:

In the Claims

In Column 17, Line 59, in Claim 5, before "sequence", insert --a--

Signed and Sealed this
Third Day of September, 2024

Katherine Kelly Vidal
*Director of the United States Patent and Trademark Office*